April 3, 1951   F. J. CHURNELL ET AL   2,546,975
EXTRUSION DEVICE
Filed Oct. 18, 1946

INVENTORS
FRANK J. CHURNELL
KENNETH E. SMITH
BY
*Percy P. Lantzy*
ATTORNEY

Patented Apr. 3, 1951

2,546,975

UNITED STATES PATENT OFFICE 2,546,975

EXTRUSION DEVICE

Frank J. Churnell, Bloomfield, and Kenneth E. Smith, Paterson, N. J., assignors to Federal Telephone and Radio Corporation, New York, N. Y., a corporation of Delaware Application October 18, 1946, Serial No. 704,128

3 Claims. (Cl. 18—13)

The present invention relates to extruding apparatus and, more specifically, to improvements in extrusion tips and dies utilized in the extrusion of a material about a core.

In certain instances it is found necessary or desirable to extrude a coating of plastic material about a core such that the coating is of uniform thickness and does not become bonded integrally with the core. Extrusion tips and dies of the constructions hitherto known may be employed to produce a core coating or jacket which has a smooth outer surface; however, the inner surface of the jacket will invariably become bonded integrally with the core during the extrusion process and will follow many of the irregularities in the contour of the core. The net result is a core jacketing of non-uniform thickness, and non-uniform insulating properties if the jacket is used for insulating purpose. Further, its bond with the core limits the core flexibility permissible without damage to the jacket, and makes it difficult to remove from the core when "stripping back" is desired. The extrusion tip and die structures of the present invention produce coatings which avoid the foregoing disadvantages, this being accomplished by the "setting" of the plastic coating material to a sufficient degree prior to its application about the core.

One of the objects of this invention, therefore, is to provide improved extrusion apparatus whereby a jacketing of substantially uniform thickness may be applied to a core without it bonding integrally therewith.

Another of the objects is to provide an extrusion tip and die arrangement which molds and pre-"sets" to a certain degree the material to be extruded and which extrudes the material in a distinctive tight fitting jacket about a core.

Figure 1:
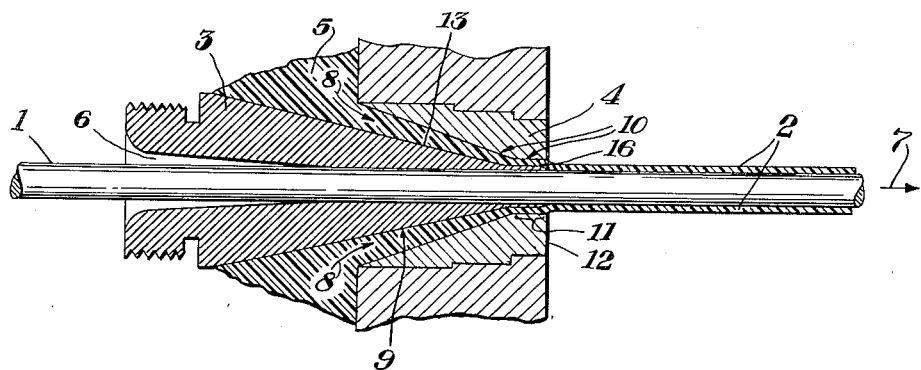
Figure 2:
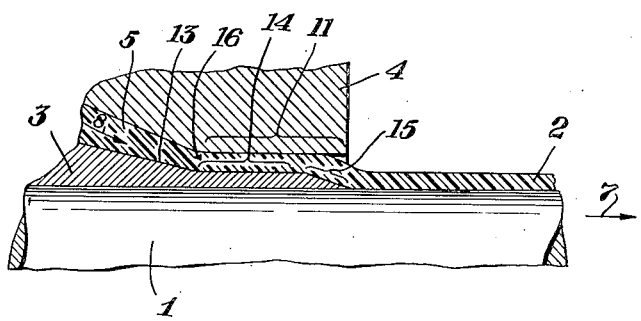

Other objects and features are embraced in the description and discussion of a preferred embodiment of the invention which follows, particular reference being had to the drawings in which:

Figure 1 illustrates in a half-sectional view the extrusion of a plastic upon a core by an extruding tip and die having the configurations and physical relationship set forth by this invention; and Figure 2 shows an enlarged view of one part of the tip and die arrangement.

The core 1, which may be, for example, a single or multistrand cable or any rod or tubular-like element, has extruded thereon the tubular tight-fitting plastic jacket 2. Only those portions of the extrusion apparatus which are required to illustrate the invention features involved herein are disclosed in the accompanying figures, and these include the extruding tip or nozzle 3 and the die 4 associated therewith. The plastic jacketing material 5 is shown flowing onto core 1 through the space separating the tip and die, although the means for forcing this heated material therethrough under pressure are omitted for the sake of clarity. Extruding is accomplished in the conventional manner, that is, the core 1 is pulled at the proper rate through the longitudinal opening 6 of tip 3 in the direction indicated by arrow 7 and the heated plastic 5 is forced under pressure through the annular passage between the tip 3 and die 4 in the direction of arrows 8.

Outer surface 9 of the tip 3 and the inner surface 10 of die 4 are preferably polished surfaces to assist in the formation of smooth inner and outer surfaces respectively of the jacket 2 applied to the core. The opening in die 4 tapers to approximately the desired outer dimension of the jacket 2 and then extends at a uniform diameter for a certain distance 11, terminating in the outermost edge 12 of the die. Important features of the tapered tip 3 are that it is coextensive, at a uniform outer diameter, with the uniform diameter of the inner surface of the die 4 over at least at part of the distance 11, and then tapers to a feather edge.

This construction is more apparent in the enlargement of Figure 2 in which the tip and die physical relationships are shown at the position at which the plastic 5 is applied to the core 1. Part of the tip 3 is included in this showing: the tapered portion 13, the extension 14 at a uniform outer diameter corresponding to the smallest diameter of tapered portion 13, and a second tapered section 15 which diminishes in outer diameter from that of the extension 14 to that of the opening through which core 1 passes. The inner surface of die 4 which extends at a uniform diameter over the distance 11 shapes the extruded plastic to form a smooth outer surface of the jacket 2, and the tip outer surfaces of extension 14 and tapered section 15 shape the extruded plastic to form a smooth inner surface of the jacket 2. The lengths of the surfaces at 11 and 14 should be sufficient to allow at least partial "setting" of the plastic prior to extrusion upon the core. Tapered section 15 guides the plastic jacket onto the core and prevents air pockets from forming between the jacket and core. Preferably this section tapers to a feather edge though this may not be essential in certain applications.

The tubular passageway 16, indicated in Figure 1 between the tip and die, extends for a sufficient distance to permit at least the desired partial "setting" or solidifying of the plastic being extruded therethrough. In prior arrangements, it was not taught to have the extrusion tip coextensive with the die for any appreciable distance as herein disclosed. The prior arrangements permit the heated plastic to be applied to the core before any extensive "setting" occurs, and smooth shaping of the jacketing is achieved only on the outer surface thereof by the action of the die on the partially "set" plastic. Also, since the greater part of the plastic solidification occurs once the plastic has been applied to the core in a molten state, there is a tendency for the plastic to bond integrally with the core. However, in the present invention, the plastic is allowed to "set" to a certain degree while flowing through the tubular passage 16, with the result that both the inner and outer surfaces of the extruded jacket are smoothly formed by polished surfaces 9 and 10 respectively. Tapering the extruding end of the tip to a feather edge prevents pockets of air from appearing beneath the jacket as it is extruded upon the core. The jacket 2 is substantially tight-fitting about the core 1, even though it is somewhat pre-formed before application. This is accomplished because of the thinness of the extruding end of the tip 3, the additional "setting" of the jacket after application to the core, and the correlation of the extruding rate and the rate at which the core is drawn through the tip and die.

Such factors as the die and tip dimensions may vary, depending upon the material to be extruded and the dimensions of the jacket to be produced. Provided that the operation of the invention as explained above is not impaired, it is not essential that the die and tip have the precise physical relationship illustrated, and the outer ends of the tip and die may not, for example, lie in the same plane, so long as they are substantially coextensive in length. The core 1 may, of course, be of any desired material or materials and may have any cross section. Likewise, the tip and die, although preferably designed to extrude a generally round tubular jacket, may be adapted to extrude a jacket of any required cross-sectional configuration.

It should be apparent, therefore, that there are many variations in the disclosed preferred embodiment which might be instituted by those skilled in the art without departing in principle or scope from the present invention, and the preferred embodiment should not be considered a limitation of the invention broadly encompassed herein.

We claim:

1. An extrusion apparatus for extruding a plastic jacket about a core of substantially circular cross-section comprising: a metallic member having an opening of substantially circular cross-section through which said core may be drawn, said member having a tapered first portion diminishing in outside diameter to a certain diameter only slightly greater than the diameter of said opening, a second portion of said certain diameter extending from said first portion for a certain distance over which the plastic is allowed to at least partially set, and a third portion tapering from said certain diameter at the end of said second portion to the diameter of said opening and the surfaces of said first, second and third portions being smooth to give the jacket a uniform inner surface, and an extrusion die surrounding said metallic member, said die having its exterior surface located in a plane adjacent the outer end of said metallic member.

2. In an extrusion device for extruding a jacket of plastic material about a core, an extrusion tip and die combination which shapes the inner and outer surfaces of said jacket, comprising: an extrusion tip having a longitudinal opening through which said core may pass, said tip being tapered to diminish in cross-section in the direction in which said core is moved through said tip, and integral extension of said tip having substantially uniform diameter equalling the smallest cross-section of the tapered portion, said extension being of sufficient length to allow at least partial setting of said plastic material as it passes thereover, a tapered section integral with said extension and tapering to substantially the cross-section of said opening, and an extrusion die having an opening therethrough mounted to surround said extrusion tip in coaxial relation with the opening in said extrusion tip, said die opening being tapered for a certain axial length and then extending for a second axial length at a uniform internal diameter greater than the cross-section of said tip extension by substantially the desired cross-section of said jacket, said second axial length being sufficient to allow at least partial setting of said plastic material as it passes therethrough, the termination of both said die and said tip being disposed in a common plane.

3. An extrusion head for use in applying a jacket to a filamentary core that comprises two, an inner and an outer, concentrically mounted annular die elements cooperating to define an annular channel through which the material to be extruded upon the core passes, the opening of the inner die element being nearly the same diameter as the diameter of the core but sufficiently larger so that the core can pass axially therethrough, the opposing surfaces of the inner and outer dies being so shaped that the annular channel initially tapers both in width and diameter, then extends uniformly in width and diameter coaxially of the opening through which the core passes for a length such that at least partial setting of the extruding material can occur while it is passing through said uniform portion of the channel, and the opposed surface of the immediate die terminating in a portion of lesser diameter such that the partially set extruded material can be passed onto the core as the core and material are passed through the head.

FRANK J. CHURNELL.
KENNETH E. SMITH.

REFERENCES CITED

The following references are of record in the file of this patent:

UNITED STATES PATENTS

| Number | Name | Date |
|---|---|---|
| 37,112 | Sault | Dec. 9, 1862 |
| 574,577 | Royle | Jan. 5, 1897 |
| 1,649,892 | Daniels | Nov. 22, 1927 |
| 1,862,947 | Smith | June 14, 1932 |
| 2,235,688 | Short | Mar. 18, 1941 |
| 2,345,086 | Becker | Mar. 28, 1944 |

FOREIGN PATENTS

| Number | Country | Date |
|---|---|---|
| 615,976 | France | Oct. 3, 1926 |
| 709,001 | France | Aug. 1, 1931 |